United States Patent
Orui et al.

(10) Patent No.: US 12,515,281 B2
(45) Date of Patent: Jan. 6, 2026

(54) FLUX

(71) Applicant: SENJU METAL INDUSTRY CO., LTD., Tokyo (JP)

(72) Inventors: Toshihiko Orui, Tokyo (JP); Hiroaki Handa, Tokyo (JP); Hiroyuki Yamasaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 585 days.

(21) Appl. No.: 17/787,797

(22) PCT Filed: Oct. 13, 2021

(86) PCT No.: PCT/JP2021/037859
§ 371 (c)(1),
(2) Date: Jun. 21, 2022

(87) PCT Pub. No.: WO2022/180920
PCT Pub. Date: Sep. 1, 2022

(65) Prior Publication Data
US 2023/0158614 A1    May 25, 2023

(30) Foreign Application Priority Data
Feb. 26, 2021  (JP) .................. 2021-030407

(51) Int. Cl.
*B23K 35/36*  (2006.01)
*B23K 35/362* (2006.01)

(52) U.S. Cl.
CPC ........ *B23K 35/3612* (2013.01); *B23K 35/362* (2013.01)

(58) Field of Classification Search
None
See application file for complete search history.

(56) References Cited

U.S. PATENT DOCUMENTS

| | | | |
|---|---|---|---|
| 2019/0358754 A1* | 11/2019 | Yamasaki | B23K 35/362 |
| 2020/0391329 A1 | 12/2020 | Onitsuka et al. | |
| 2021/0101232 A1 | 4/2021 | Mizowaki | |

FOREIGN PATENT DOCUMENTS

| | | |
|---|---|---|
| CN | 108672985 A | 10/2018 |
| CN | 110091096 | 8/2019 |
| EP | 3895838 A1 | 10/2021 |
| JP | 6322881 B1 | 5/2018 |
| JP | 6501003 B1 | 4/2019 |
| JP | 2020-049495 A | 4/2020 |

(Continued)

OTHER PUBLICATIONS

Machine translation of JP 6725861B1. (Year: 2020).*

(Continued)

*Primary Examiner* — Xiaowei Su
(74) *Attorney, Agent, or Firm* — Harness, Dickey & Pierce, P.L.C.

(57) ABSTRACT

An objective of the present invention is to provide a flux that suppresses occurrence of flux drying up during soldering and occurrence of precipitation during storing.
The flux comprising, based on the whole flux,
  3.5 to 11% by mass of a rosin ester,
  more than 0% by mass and 18% by mass or less of a rosin resin other than a rosin ester, and
  70% by mass or more and less than 96.5% by mass of a solvent.

7 Claims, 3 Drawing Sheets

(56) References Cited

FOREIGN PATENT DOCUMENTS

| | | |
|---|---|---|
| JP | 6725861 B1 | 7/2020 |
| WO | WO-2018/135427 A1 | 7/2018 |
| WO | WO-2019/123674 A1 | 6/2019 |
| WO | WO-2020/116372 A1 | 6/2020 |

OTHER PUBLICATIONS

Machine translation of JP6501003B1. (Year: 2019).*
Office Action issued in Chinese Patent Application CN202180009328.8 issued Dec. 22, 2023.
International Search Report and Written Opinion of the International Searching Authority issued in PCT/JP2021/037859, mailed Jan. 11, 2022; ISA/JP.

* cited by examiner

FLUX

CROSS-REFERENCE TO RELATED APPLICATIONS

This application is a U.S. National Phase Application under 35 U.S.C. 371 of International Application No. PCT/JP2021/037859 filed on Oct. 13, 2021, which claims the benefit of priority from Japanese Patent Application No. 2021-030407 filed Feb. 26, 2021. The entire disclosures of the above applications are incorporated herein by reference.

TECHNICAL FIELD

The present invention relates to a flux.

BACKGROUND ART

Fixing and electrical connection of electronic components in electronic devices, such as mounting of the electronic components on printed circuit boards, are generally performed by soldering, which is the most advantageous in terms of costs and reliability.

The methods commonly employed for this type of soldering are a flow soldering method, in which the printed circuit boards and the electronic components are soldered by bringing them into contact with molten solder, and a reflow soldering method, in which solder in a form of solder paste, a solder preform, or a solder ball is re-melted in a reflow oven to perform the soldering.

In the soldering, a flux is used as an auxiliary agent that makes it easier for the solder to adhere to the printed circuit boards and the electronic components. The flux performs a number of useful actions, including:

(1) a metal surface cleaning action (the action of chemically removing oxide films from metal surfaces of the printed circuit boards and the electronic components to clean the surfaces so that they can be soldered);

(2) an anti-reoxidation action (the action to cover the cleaned metal surface during soldering, to block contact with oxygen, and prevent the metal surface from being re-oxidized by heating); and (3) an interface tension reduction action (the action to reduce surface tension of the molten solder and improves wettability of the metal surface by the solder).

In the soldering of the printed circuit boards by the flow soldering method, the flux (post-flux) is applied on the parts to be soldered before or after mounting of the electronic components. After that, the printed circuit boards after application of the post-flux are then passed over the solder jetted in a flow soldering machine to perform the flow soldering.

Further, soldering of the printed circuit boards having through-holes by the flow soldering method is performed by supplying the solder from lower parts of the through-holes and allowing the solder to spread to upper parts of the through-holes. In this case, the solder supplied from the lower parts of the through-holes needs to rise through the through-holes (through-hole rising). However, as the printed circuit boards have become multi-layered in recent years, there is a problem that heat transfer to the solder becomes worse to the upper parts of the through-holes. In order to improve the through-hole rising by increasing the heat transfer to the solder, the flow soldering method in recent years has tended to perform heating at high temperatures for long periods of time by increasing an immersion time of the printed circuit boards in the solder.

Furthermore, since the flux used for the soldering is sometimes stored for long periods of time until using in fact, it is also required that precipitation should not occur during storing.

As the flux used for the soldering by the conventional flow soldering method, PTL 1 specifically discloses the flux including at least one selected from 0.3 to 2.0% by mass of an organic chlorine compound and more than 0.04% by mass and 1.00% by mass or less of an amine hydrochloride, and 0.2 to 1.5% by mass of an organic phosphorous compound, which is at least one selected from a phosphonic acid ester and a phenyl-substituted phosphinic acid.

Further, PTL 2 discloses a flux composition including a rosin-modified product being a reaction product of a rosin or a rosin derivative with an alkanolamine represented by specific Formula (1), the rosin modified product having an amide bond obtained by condensing a COOH group of the rosin or the rosin derivative and a $NH_{3-n}$ group in Formula (1), or an ester bond obtained by condensing a COOH group of the rosin or the rosin derivative and an OH group in Formula (1).

CITATION LIST

Patent Literature

PTL 1: Japanese Patent No. 6322881
PTL 2: Japanese Patent No. 6725861

SUMMARY OF INVENTION

Technical Problem

The flux described in PTL 1 can suppress occurrence of bridging and balling during soldering, and in Examples of PTL 1 specifically shown is the flux containing 1.60% by mass or 3.00% by mass of a rosin ester.

As a result of intensive studies of the present inventors, it has been found that when the conventional flux is heated at an elevated temperature for long periods of time by increasing the immerging time of the printed circuit boards in the solder during the flow soldering as described above, there can occur that the post-flux applied to the through-holes, etc. of the printed circuit board disappears due to volatilization, etc. (flux drying up). Since the flux containing only a small amount (3.0% by mass or less) of the rosin ester specifically shown in PTL 1 is short of heat resistance, as described later in Comparative Examples 1 and 4 of the present application, the flux drying up occurs, and thus it has been found that there is a room for improvement in terms of suppressing the drying up.

Also, the flux composition described in PTL 2 has a problem to be solved that occurrence of migration is suppressed, and contains the rosin-modified product described above as an essential component for solving the problem. However, in PTL 2, there is no disclosure with respect to suppressing occurrence of the flux drying up when soldering and suppressing occurrence of precipitation during storing.

As described above, desired is a flux that is able to suppress the occurrence of the flux drying up during soldering by improving the heat resistance of the flux, and to suppress the occurrence of the precipitation during storing.

An objective of the present invention is to provide the flux that suppresses the occurrence of the flux drying up during soldering and the occurrence of the precipitation during storing.

Solution to the Problem

As a result of intensive studies to solve the above problem, the present inventors have found that the above problem can be solved by using a flux which includes specific amounts of a rosin ester, a rosin resin other than a rosin ester and a solvent, and arrived at completing the present invention. Specific embodiments of the present invention are as follows.

Here, in the present description, when representing a numerical range by using "X to Y", its range includes numerical values of both ends.

[1] A flux comprising, based on the whole flux,
3.5 to 11% by mass of a rosin ester,
more than 0% by mass and 18% by mass or less of a rosin resin other than a rosin ester, and
70% by mass or more and less than 96.5% by mass of a solvent.

[2] The flux according to [1], further comprising 0.01 to 1% by mass of an amine hydrobromide, based on the whole flux.

[3] The flux according to [1] or [2], further comprising an organic acid.

[4] The flux according to any one of [1] to [3], further comprising, based on the whole flux,
0.3 to 2% by mass of an organic chlorine compound, and
0.2 to 1.5% by mass of an organic phosphorous compound.

[5] The flux according to [4], wherein the organic chlorine compound is at least one selected from the group consisting of chlorendic acid, chlorendic anhydride, and methyl pentachlorooctadecanoate.

[6] The flux according to [4] or [5], wherein the organic phosphorous compound is at least one selected from the group consisting of 2-ethylhexyl (2-ethylhexyl)phosphonate, n-octyl (n-octyl)phosphonate, n-decyl (n-decyl)phosphonate, and n-butyl (n-butyl)phosphonate.

[7] The flux according to any one of [1] to [6], for use in a flow soldering method.

[8] The flux according to any one of [1] to [7], wherein the rosin resin other than a rosin ester is a rosin resin except a rosin-modified product below:
a rosin-modified product being a reaction product of a rosin or a rosin derivative with an alkanolamine represented by the following Formula (1), the rosin-modified product having an amide bond obtained by condensing a COOH group of the rosin or the rosin derivative and a $NH_{3-n}$ group in Formula (1), or an ester bond obtained by condensing a COOH group of the rosin or the rosin derivative and an OH group in Formula (1):

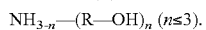

$NH_{3-n}$—(R—OH)$_n$ ($n \leq 3$).   Formula (1)

Advantageous Effects of Invention

The flux of the present invention can suppress the occurrence of the flux drying up during soldering and the occurrence of the precipitation during storing.

DESCRIPTION OF EMBODIMENTS

Figure 1:
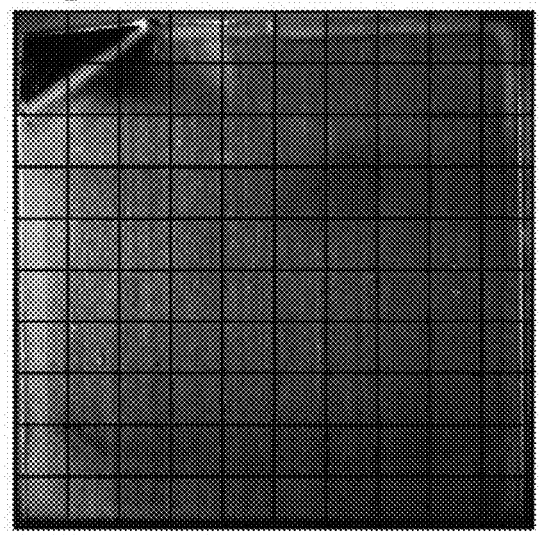
FIG. 1 is a photograph of a copper plate of Comparative Example 1 used for evaluation of occurrence of drying up.
Figure 2:
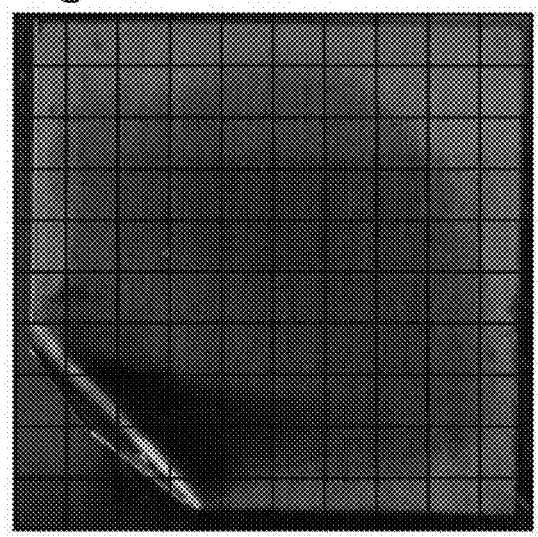
FIG. 2 is a photograph of a copper plate of Example 1 used for the evaluation of the occurrence of drying up.
Figure 3:
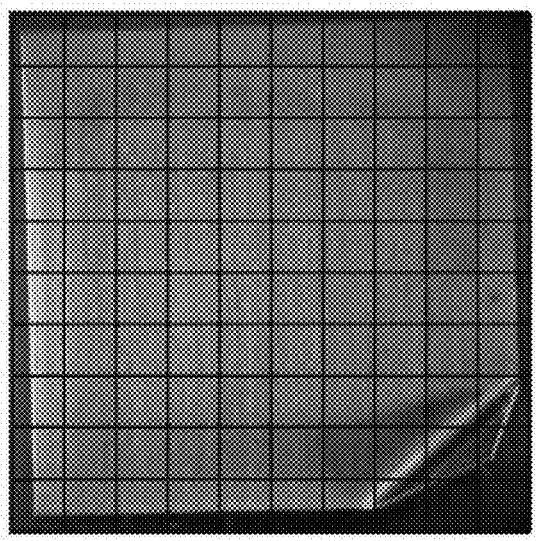
FIG. 3 is a photograph of a copper plate of Example 2 used for the evaluation of the occurrence of drying up.
Figure 4:
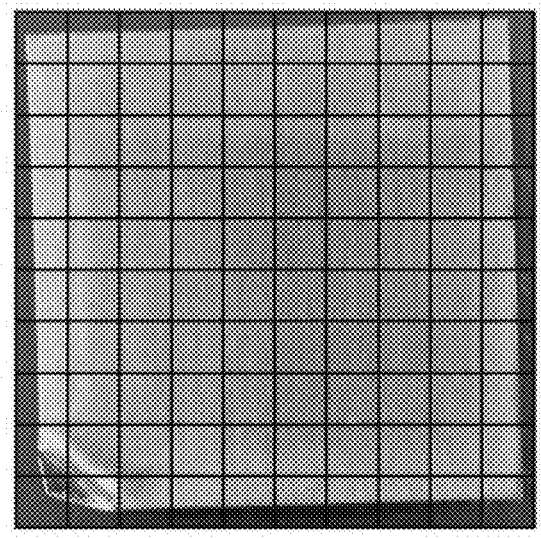
FIG. 4 is a photograph of a copper plate of Example 12 used for the evaluation of the occurrence of drying up.
Figure 5:
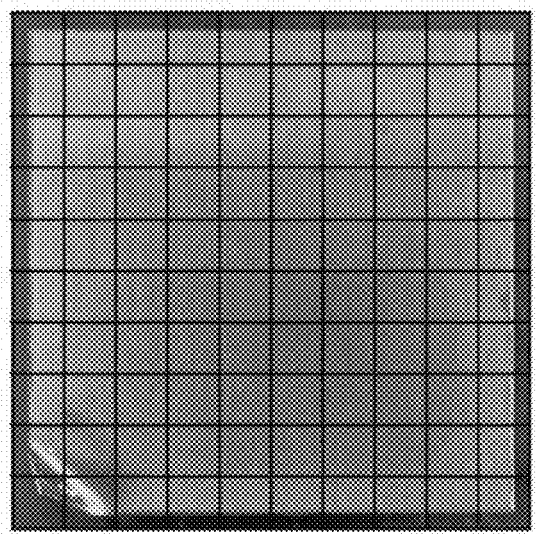
FIG. 5 is a photograph of a copper plate of Example 3 used for the evaluation of the occurrence of drying up.

Hereinafter, the flux of the present invention is explained.

In the present invention, a rosin ester is a kind of rosin resin, and means a rosin derivative having an ester bond.

In the present invention, a rosin resin means a rosin, a rosin derivative (a rosin being subjected to modification such as esterification, polymerization and hydrogenation), or a combination of them.

The flux of the present invention comprises, based on the whole flux, 3.5 to 11% by mass of a rosin ester, more than 0% by mass and 18% by mass or less of a rosin resin other than a rosin ester, and 70% by mass or more and less than 96.5% by mass of a solvent. The flux of the present invention comprises specific amounts of the rosin ester, the rosin resin other than a rosin ester, and the solvent, and thereby can suppress occurrence of flux drying up during soldering and occurrence of precipitation during storing.

The rosin ester is not limited, but may include: HARI-TACK, Product Number: SE10, PH, F85, FK100, FK125, 4740, 28JA, PCJ, manufactured by Harima Chemicals Inc.; AA-G, AA-L, AA-V, 105, AT, H, HP, GA-100, AZ, C, D-125, D-135, D-160, KK, KE-100, KE-311, PE-590, KE-359, A-18, A-75, A-100, A-115, A-125, SUPER ESTER E-720, SUPER ESTER E-730-55, SUPER ESTER E-788, SUPER ESTER E-900-NT, SUPER ESTER E-865, SUPER ESTER E-865-NT, SUPER ESTER NS-100H, SUPER ESTER NS-121, manufactured by Arakawa Chemical Industries, Ltd.; a polymerized rosin ester, a hydrogenated rosin ester, a disproportionated rosin ester, manufactured by Maruzen Chemical Trading Co., Ltd.; or combinations of two or more among them can be used.

A content of the rosin ester based on the whole flux is 3.5 to 11% by mass, preferably 4.0 to 11% by mass, and more preferably 5 to 11% by mass. When the content of the rosin ester is less than 3.5% by mass, it is difficult to sufficiently suppress the occurrence of the flux drying up during soldering. As described above, the flux containing only a little rosin ester (3.00% by mass or less) specifically shown in PTL 1 has insufficient heat resistance, and therefore the flux drying up occurs. When the content of the rosin ester is more than 11% by mass, flux precipitation occurs during storing. Further, when the content of the rosin ester is 4.0% by mass or more, the occurrence of the flux drying up can be suppressed more effectively compared with the case that the content of the rosin ester is 3.5% by mass or more and less than 4.0% by mass, as shown in Examples 1 to 9 described later. Furthermore, when the content of the rosin ester is 5% by mass or more, the occurrence of the flux drying up can be suppressed more effectively compared with the case that the content of the rosin ester is 4.0% by mass or more and less than 5% by mass, as shown in Examples 2 to 16 described later. The content of the rosin ester may be 3.5% by mass, 3.7% by mass, 3.9% by mass, 4.0% by mass, 4.5% by mass, 5% by mass, 5.5% by mass, 6% by mass, 6.5% by mass, 7% by mass, 7.5% by mass, 8% by mass, 8.5% by mass, 9% by mass, 9.5% by mass, 10% by mass, 10.5% by mass, or 11% by mass, or in a range between any two of these numbers.

The rosin resin other than a rosin ester is not limited, but may include: a raw material rosin such as gum rosin, wood rosin, tall oil rosin; derivatives other than a rosin ester obtained from the raw material rosin; or combinations of them. The derivatives include: e.g., purified rosin, hydrogenated rosin, disproportionated rosin, polymerized rosin, or α, β-unsaturated carboxylic acid modified product (acrylic modified rosin, maleic modified rosin, fumaric modified rosin, etc.); a purified product, a hydrogenated product or a disproportionated product of the polymerized rosin; a purified product, a hydrogenated product or disproportionated product of the α, β-unsaturated carboxylic acid modified product; and two or more of them. Among them, preferable are acrylic acid modified hydrogenated rosin, acrylic acid modified rosin, disproportionated rosin, hydrogenated rosin, polymerized rosin, or combinations of two or more among them.

The rosin resin other than a rosin ester may be a rosin resin except a rosin-modified product below:

a rosin-modified product being a reaction product of a rosin or a rosin derivative with an alkanolamine represented by the following Formula (1), the rosin-modified product having an amide bond obtained by condensing a COOH group of the rosin or the rosin derivative and a $NH_{3-n}$ group in Formula (1), or an ester bond obtained by condensing a COOH group of the rosin or the rosin derivative and an OH group in Formula (1):

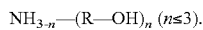

$$NH_{3-n}\text{—}(R\text{—}OH)_n \ (n \leq 3).$$  Formula (1)

Further, the flux of the present invention may not contain the above rosin-modified product.

The above rosin-modified product corresponds to the rosin-modified product contained as an essential component in the flux composition described in PTL 2 described above.

The content of the rosin resin other than a rosin ester based on the whole flux is more than 0% by mass and 18% by mass or less, preferably 1 to 15% by mass, and more preferably 5 to 13% by mass. When the content of the rosin resin other than a rosin ester is 0% by mass (not contain the rosin resin other than a rosin ester), the occurrence of the flux drying up cannot be fully suppressed during soldering, and also the precipitation in the flux occurs during storing. When the content of the rosin resin other than a rosin ester is more than 18% by mass, there are more residues after soldering. The content of the rosin resin other than a rosin ester may be more than 0% by mass, 0.5% by mass, 1% by mass, 3% by mass, 5% by mass, 6% by mass, 7% by mass, 8% by mass, 10% by mass, 13% by mass, 15% by mass, or 18% by mass, or within a range between any two of these numerical values.

The ratio of the content (% by mass) of the rosin ester and the content (% by mass) of the rosin resin other than a rosin ester (the content (% by mass) of the rosin ester:the content (% by mass) of the rosin resin other than a rosin ester) is preferably 1:4.1 to 11:1, more preferably 1:3 to 4.5:1, and most preferably 1:2.4 to 0.6:1. When the ratio of the content (% by mass) of the rosin ester and the content (% by mass) of the rosin resin other than a rosin ester is within the above numerical range, the occurrence of the flux drying up during soldering and the precipitation in the flux during storing can be more effectively suppressed.

The solvent is not limited, but may include: an alcohol solvent such as isopropyl alcohol, ethanol; or combinations of two or more among them.

The content of the solvent based on the whole flux is 70% by mass or more and less than 96.5% by mass, preferably 70 to 95% by mass, and more preferably 80 to 93% by mass. When the content of the solvent is less than 70% by mass, there are more residues after soldering. Also, when it is 96.5% or more, enough activity cannot be obtained as the flux. The content of the solvent may be 70% by mass, 75% by mass, 80% by mass, 85% by mass, 90% by mass, 95% by mass, 96% by mass, or less than 96.5% by mass, or within a range between any two of these numerical values.

The flux of the present invention may further contain 0.01 to 1% by mass of an amine hydrobromide based on the whole flux. The flux can improve wettability of solder by further containing a specific amount of the amine hydrobromide.

The amine hydrobromide is not limited, but may include 2-ethylhexylamine hydrobromide, pyridine hydrobromide, isopropylamine hydrobromide, cyclohexylamine hydrobromide, monoethylamine hydrobromide, diethylamine hydrobromide, triethylamine hydrobromide, 1,3-diphenylguanizine hydrobromide, dimethylamine hydrobromide, rosin amine hydrobromide, 2-pipecolic hydrobromide, hydrazine hydrate hydrobromide, trinonylamine hydrobromide, diethylaniline hydrobromide, 2-diethylaminoethanol hydrobromide, diarylamine hydrobromide, hydrazine monohydrobromide, hydrazine dihydrobromide, aniline hydrobromide, dimethylcyclohexylamine hydrobromide, ethylenediamine dihydrobromide, 2-phenylimidazole hydrobromide, 4-benzylpyridine hydrobromide, or combinations of two or more among them. Among them, from a point of view of improving the wettability of solder, preferable are the monoethylamine hydrobromide, the 1,3-diphenylguanizine hydrobromide, the diethylaniline hydrobromide, the dimethylcyclohexylamine hydrobromide, the ethylenediamine dihydrobromide, the 2-phenylimidazole hydrobromide, or combinations of two or more among them, and particularly preferable are the monoethylamine hydrobromide, the 1,3-diphenylguanizine hydrobromide, or a combination of them.

The content of the amine hydrobromide based on mass of the whole flux is preferably 0.01 to 1% by mass, more preferably 0.05 to 0.7% by mass, and most preferably 0.10 to 0.5% by mass. When a content of amine hydrobromide is within the above range, the wettability of solder can be improved.

The flux of the present invention may further contain an organic acid. The organic acid may be an organic acid other than an organic chlorine compound described later.

The organic acid may include adipic acid, azelaic acid, eicosane diacid, citric acid, glycolic acid, glutaric acid, succinic acid, salicylic acid, diglycollic acid, dipicolinic acid, dibutylanilinediglycollic acid, suberic acid, sebacic acid, thioglycolic acid, terephthalic acid, dodecanedioic acid, p-hydroxyphenyl acetic acid, palmitic acid, picolinic acid, phenyl succinic acid, phthalic acid, fumaric acid, maleic acid, malonic acid, lauric acid, benzoic acid, tartaric acid, tris(2-carboxylethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutalic acid, 2-quinolinecarboxylic acid, 3-hydroxybenzoic acid, malic acid, p-anisic acid, stearic acid, 12-hydroxystearic acid, oleic acid, linolic acid, linolenic acid, dimer acid, hydrogenated dimer acid, trimer acid, hydrogenated trimer acid, or combinations of two or more among them. Among them, from points of view of the wettability and matting nature of solder, preferable are the palmitic acid, the succinic acid, the glutaric acid, the adipic acid, the sebacic acid, or combinations of two or more among them, and particularly preferable are the palmitic acid, the succinic acid, the glutaric acid, or combinations of two or more among them.

The content of the organic acid based on the whole flux is preferably 0.01 to 7% by mass, and more preferably 0.1 to 3% by mass. When the content of the organic acid is within the above range, the wettability of solder can be improved.

The flux of the present invention may further contain 0.3 to 2% by mass of the organic chlorine compound and 0.2 to 1.5% by mass of an organic phosphorous compound, based on the whole flux.

The organic chlorine compound is not limited, but may include chlorendic acid, chlorendic anhydride, methyl pentachlorooctadecanoate, or combinations of two or more among them. Among them, from the point of view of the wettability of solder, methyl pentachlorooctadecanoate is preferable.

When the flux contains the organic chlorine compound, a content of the organic chlorine compound based on the whole flux is preferably 0.3 to 2% by mass, and more preferably 0.5 to 1.5% by mass.

The organic phosphorous compound is not limited, but may include a phosphonic acid ester, a phenyl-substituted phosphinic acid, or combinations of them.

The phosphonic acid ester is not limited, but may include 2-ethylhexyl (2-ethylhexyl)phosphonate, n-octyl (n-octyl) phosphonate, n-decyl (n-decyl)phosphonate, n-butyl (n-butyl)phosphonate, or combinations of two or more among them. Among them, from a point of view of reduction of soldering balls, the 2-ethylhexyl (2-ethylhexyl)phosphonate is preferable.

The phenyl-substituted phosphinic acid is not limited, but may include phenylphosphinic acid, diphenylphosphinic acid, or combination of them.

The content of the organic phosphorous compound based on the whole flux is preferably 0.2 to 1.5% by mass, and more preferably 0.3 to 1.0% by mass.

When the content of the organic chlorine compound and the content of the organic phosphorous compound are within the above range, occurrence of solder bridging and solder balling can be suppressed.

The flux of the present invention may contain other resins other than the rosin resin as long as it does not affect the effects of the present application.

Other resins other than the rosin resin are not limited, but may include a terpene resin, a modified terpene resin, a terpenephenol resin, a modified terpenephenol resin, a styrene resin, a modified styrene resin, a xylene resin, a modified xylene resin, or combinations of two or more among them. The modified terpene resin may include an aromatically modified terpene resin, a hydrogenated terpene resin, a hydrogenated aromatically modified terpene resin, or combinations of two or more among them. The modified terpenephenol resin may include a hydrogenated terpenephenol resin. The modified styrene resin may include a styrene-acrylic resin, a styrene-maleic acid resin, or combinations of two or more among them. The modified xylene resin may include a phenol-modified xylene resin, an alkylphenol-modified xylene resin, a phenol-modified resol-type xylene resin, a polyol-modified xylene resin, a polyoxyethylene added xylene resin, or combinations of two or more among them.

The content of other resins other than the rosin resin based on mass of the whole flux is preferably 0.2 to 18% by mass, and more preferably 0.3 to 15% by mass. When the content of other resins other than the rosin resin is within the above range, an insulation property can be improved due to having moisture resistance.

The flux of the present invention may contain an activator other than the organic chlorine compound, the amine hydrobromide, and the organic acid, described above as long as it does not affect the effects of the present application. Such an activator is not limited, but may include an amine compound, an amine hydrohalide, an organohalogen compound, or combinations of two or more among them.

The amine compound is not limited, but may include an aliphatic amine, an aromatic amine, an amino alcohol, imidazole, benzotriazole, an amino acid, guanidine, a hydrazide, or combinations of them.

The amine hydrohalide may include a hydrohalide (such as a salt of HCl, HF, or HI) other than the amine hydrobromide described above.

The amine hydrohalide other than the amine hydrobromide is not limited, but may include a stearylamine hydrochloride, a diethylaniline hydrochloride, a diethanolamine hydrochloride, a dimethylamine hydrochloride, a 2-ethylhexylamine hydrochloride, an isopropylamine hydrochloride, a cyclohexylamine hydrochloride, a 1,3-diphenylguanidine hydrochloride, a dimethylbenzylamine hydrochloride, a dimethylcyclohexylamine hydrochloride, a 2-diethylaminoethanol hydrochloride, a diarylamine hydrochloride, a monoethylamine hydrochloride, a diethylamine hydrochloride, a triethylamine hydrochloride, a hydrazine monohydrochloride, a hydrazine dihydrochloride, a pyridine hydrochloride, a butylamine hydrochloride, a hexylamine hydrochloride, a n-octylamine hydrochloride, a dodecylamine hydrochloride, a L-glutamic acid hydrochloride, a N-methylmorpholine hydrochloride, a betaine hydrochloride, ammonium chloride, a 2-pipecolic hydroiodide, a cyclohexylamine hydroiodide, a 1,3-diphenylguanidine hydrofluoride, a diethylamine hydrofluoride, a 2-ethylhexylamine hydrofluoride, a cyclohexylamine hydrofluoride, an ethylamine hydrofluoride, a rosinamine hydrofluoride, a cyclohexylamine tetrafluoroborate, a dicyclohexylamine tetrafluoroborate, or combinations of two or more among them. Among them, from a point of view of solder cutability, preferable is the cyclohexylamine tetrafluoroborate.

The content of the amine hydrohalide other than the amine hydrobromide based on the whole flux is preferably 0 to 2% by mass, and more preferably 0.02 to 1% by mass. When the content of the amine hydrohalide is within the above range, the wettability of solder can be improved.

The organohalogen compound may include an organohalogen compound other than the organic chlorine compound described above.

The organohalogen compound other than the organic chlorine compound is not limited, but may include trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-dibromosuccinic acid, n-hexadecyltrimethylammonium bromide, triallylisosyanurate hexabromide, 2,2-bis[3,5-dibromo-4-(2,3-dibromopropoxy)phenyl]propane, bis[3,5-dibromo-4-(2,3-dibromopropoxy)phenyl]sulfone, ethylenebispentabromobenzene, brominated bisphenol A-type epoxy resin, or combinations of two or more among them. Among them, from the point of view of the wettability of solder, preferable are the trans-2,3-dibromo-2-butene-1,4-diol, the 2,3-dibromo-1,4-butanediol, or combination of them.

The content of the organohalogen compound other than the organic chlorine compound based on the whole flux, is preferably 0 to 3% by mass, and more preferably 0.1 to 1.5% by mass. When the content of the organohalogen compound is within the above range, the wettability of solder can be improved.

The flux of the present invention may further contain a coloring agent, a surfactant, or combination of them.

In the present invention, the flux can be prepared by mixing the respective components using a known method in the art, so that the flux is composed of 3.5 to 11% by mass of the rosin ester, more than 0% by mass and 18% by mass or less of the rosin resin other than the rosin ester, and 70% by mass or more and less than 96.5% by mass of the solvent, based on the whole flux, to dissolve the components other than the solvent in the solvent.

Also, in the present invention, the flux can be prepared by heating and mixing predetermined amounts of the rosin ester and the rosin resin other than the rosin ester using a known method in the art to prepare a resin composition for the flux, and diluting the resin composition for the flux using a predetermined amount of the solvent.

The flux of the present invention can be used for a flow soldering method. As the composition of a solder alloy used for the flow soldering method, a known solder alloy composition can be used. Specifically, the solder alloy composition includes a Sn—Ag alloy, a Sn—Cu alloy, a Sn—Ag—Cu alloy, a Sn—In alloy, a Sn—Pb alloy, a Sn—Bi alloy, a Sn—Ag—Cu—Bi alloy, and alloys in which Ag, Cu, In, Ni, Co, Sb, Ge, P, Fe, Zn, Ga, etc. are further added to the above alloy composition.

Hereinafter, the present invention will be described in detail with reference to the following Examples, but the present invention is not limited to the Examples.

EXAMPLES (Evaluation)

With respect to each flux of Examples 1 to 42 and Comparative Examples 1 to 5, performed were the following (1) evaluation of occurrence of drying up, (2) evaluation of occurrence of precipitation, and (3) comprehensive evaluation. Further, with respect to each flux of Examples 7, 8, and 32, the following (4) evaluation of a solder spreading property (wettability) with the flux was also performed. Results of the above (1) to (3) and results of the above (4) are shown in Tables 3 to 6 and Table 7, respectively.

(1) Evaluation of Occurrence of Drying Up

A copper plate (30 mm in length×30 mm in width×0.3 mm in thickness) was prepared, and on a center of a surface of the copper plate, 0.1 ml of the flux (liquid) was dropped by using a microsyringe. Since the dropped flux was spontaneously spread over the whole surface of the copper plate, obtained was the copper plate which the flux is applied on the whole surface of the copper plate. The copper plate obtained in this way on which the flux was applied was put into a thermostatic oven to be heated at a temperature of 150° C. for 60 seconds (preheating). After placing the preheated copper plate on the center of a hot plate (260 mm in length×200 mm in width) set at a temperature of 265° C. so as to uniformly heat the whole copper plate, the copper plate was heated for 10 seconds (main heating). Then, the whole surface of the copper plate after the main heating was photographed to fit it in one picture (30 mm in length×30 mm in width), and to highlight the original color of the copper plate, the picture was blue-processed by using Windows (registered trademark) Photo Viewer under the conditions as follows: contrast of +70; highlight of −60; and warmth of −70. The photograph (30 mm in length×30 mm in width) after the blue-processing was divided into each region (3 mm in length×3 mm in width) so as to be 100 pieces of squares in total of 10 pieces in length×10 pieces in width. And, each region on the photograph was visually observed to be classified in (i) a part that the flux remained and oxidation of the copper plate was suppressed due to reducing action of the flux so that discoloring was not observed, and (ii) a part that the flux disappeared (dried up) and the copper plate was oxidized to change into brown color. Then, a ratio (%) of the number of parts (i) in which discoloring of the copper plate did not appear was calculated based on the 100 pieces of the whole regions, to perform 5-grade evaluation in accordance with the following criteria. It means that the larger a rank number below, more suppressed can be the occurrence of the flux drying up.

Rank 1: less than 10%
Rank 2: 10% or more and less than 30%
Rank 3: 30% or more and less than 50%
Rank 4: 50% or more and less than 80%
Rank 5: 80% or more Further, photographs used for the evaluation of Comparative Example 1, and Examples 1, 2, 12 and 3 are respectively shown in FIGS. 1 to 5.

(2) Evaluation of Occurrence of Precipitation

The flux (liquid) of 10 ml was put into a transparent container, and after leaving it to stand at a temperature condition of −15° C. for 15 minutes, the evaluation of the occurrence of the precipitation was performed by visually observing an appearance of the flux in the container in accordance with criteria of the following Table 1.

TABLE 1

| Evaluation Criteria for Occurrence of Precipitation |
| --- |
| ○: No cloudiness was observed visually no precipitation occurred) |
| x: Cloudiness was observed visually (precipitation occurred) |

(3) Comprehensive Evaluation

Based on the evaluation results of the above (1) and (2), comprehensive evaluation was performed in accordance with criteria of the following Table 2.

TABLE 2

| Criteria for Comprehensive Evaluation |
| --- |
| ○: Evaluation of occurrence of drying up was Rank 3 or more, and no precipitation occurred. |
| x: Evaluation of occurrence of drying up was Rank 2 or less, and/or precipitation occurred. |

(4) Evaluation of Solder Spreading Property (Wettability) with Flux

In accordance with JIS Z 3197, the solder and the flux were put on an oxidized copper plate, efficacy of the flux was evaluated by measuring a solder spreading ratio after heating and melting.

Figure 6:
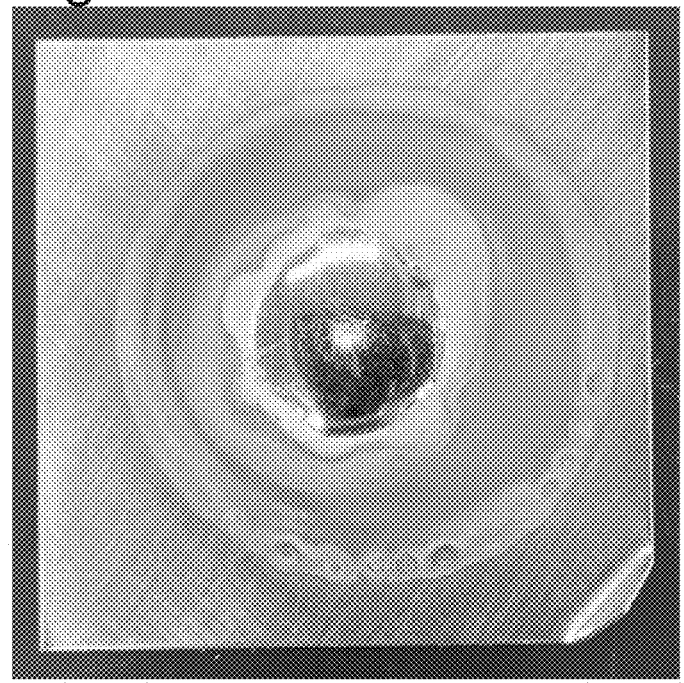
FIG. 6 is a photograph of a sample (layered body) of Example 32 used for evaluation of solder spreading property (wettability).

A copper plate (30 mm in length×30 mm in width×0.3 mm in thickness) was prepared, and the copper plate was heated in the thermostatic oven at 150° C. for 1 hour, to obtain the oxidized copper plate. On the oxidized copper plate obtained, a solder ring (composition: 3.0% by mass of Ag, 0.5% by mass of Cu, the balance being Sn) (6.5 mm in diameter (outer diameter)×3 mm in inner diameter×1.7 mm in thickness, 0.21 g) was placed so that a center portion of the oxidized copper plate is aligned with a center of the solder ring, to obtain a layered body of the oxidized copper plate and the solder ring. On the center portion of the oxidized copper plate of the obtained layered body (the center of the solder ring), 50 µl of the flux was dropped by using a microsyringe. Since the flux dropped overflowed from an inner region of the solder ring to an outer region of the solder ring to spontaneously spread to a part of the oxidized copper plate surface (in Example 32 shown in FIG. 6, an area of a circle of about 10 to 12 mm in radius, centered on the point where the flux was dropped), obtained was the layered body in which the flux was applied on the entire surface of the solder ring and a part of the oxidized copper plate surface. The layered body obtained in this way, in which the flux was applied on the surface of the solder ring and a part of the oxidized copper plate surface, was placed on the center of the hot plate (260 mm in length×200 mm in width) set at a temperature of 250° C. so as to heat the entire layered body homogeneously, and heated for 30 seconds. A photograph of the layered body after heating of Example 32 is shown in FIG. 6. As seen from the photograph of FIG. 6, the solder ring was melted due to heating, and the solder was wetted and spread on the oxidized steel plate. In the layered body after heating, a portion which a thickness (height) of the solder on the oxidized copper plate was maximum was specified, and a total thickness (height) of the oxidized copper plate and the solder of the above portion was measured by a digital micrometer. By subtracting the thickness of the oxidized copper plate from the obtained total thickness (height) of the oxidized copper plate and the solder, the height of the solder H (mm) was calculated. Then, based on the following expression described in JIS Z 3197, the spreading ratio (%) of the solder was calculated.

$$Sr = \frac{D-H}{D} \times 100 \quad \text{[Expression 1]}$$

Sr: Spreading ratio of solder (%), H: Height of solder spread (mm),
D: Diameter of case that the solder ring used is regarded as sphere (mm), $D=1.24 \times V^{1/3}$ (V: volume of the solder ring used (mass/density))

Examples 1 to 42, Comparative Examples 1 to 5

Using compositions shown in the following Tables 3 to 7, each flux of Examples 1 to 42 and Comparative Examples 1 to 5 was prepared.

Here, the numerical value for each component in the following Tables 3 to 7 represents % by mass of each component based on mass of the whole flux.

TABLE 3

| | | Examples | | | | | | | | | Comparative Examples | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Rosin Resin | Acrylic acid modified hydrogenated rosin | 3.0 | 3.0 | 3.0 | 3.0 | 3.0 | | 3.0 | 3.0 | 3.0 | 3.0 | 3.0 | | 3.0 | 3.0 |
| | Hydrogenated rosin | 5.0 | 5.0 | 5.0 | 5.0 | 5.0 | 5.0 | 5.0 | 5.0 | 5.0 | 5.0 | 5.0 | | 5.0 | 5.0 |
| | Rosin ester | 3.5 | 4.0 | 6.0 | 8.0 | 11.0 | 4.0 | 4.0 | 4.0 | 4.0 | 3.0 | 12.0 | 4.0 | 3.0 | 12.0 |
| Organic acid | Palmitic acid | 0.3 | 0.3 | 0.3 | 0.3 | 0.3 | | | 0.01 | 0.3 | 0.3 | 0.3 | | 0.3 | 0.3 |
| Organic chlorine compound | Methyl pentachloro-octadecanoate | | | | | | | | | 1.0 | | | | 1.0 | 1.0 |
| Organobromine compound | 2,3-Dibromo-1,4-butanediol | | | | | | | | | 0.8 | 0.8 | 0.8 | | 0.8 | 0.8 |
| Amine hydrobromide | Monoethylamine hydrobromide | | | | | | | | | 0.1 | 0.1 | 0.1 | | 0.1 | 0.1 |
| | 1,3-Diphenylguanizine hydrobromide | | | | | | | | | 0.5 | 0.5 | 0.5 | | 0.5 | 0.5 |
| Amine borohydrofluorid | Cyclohexylamine tetrafluoroborate | | | | | | | | | 0.1 | 0.1 | 0.1 | | 0.1 | 0.1 |
| Phosphonic acid ester | 2-ethylhexyl (2-ethylhexyl) phosphonate | | | | | | | | | 0.5 | | | | 0.5 | 0.5 |
| Solvent | Isopropyl alcohol | 88.2 | 87.7 | 85.7 | 83.7 | 80.7 | 91.0 | 88.0 | 87.99 | 84.7 | 87.2 | 78.2 | 96.0 | 85.7 | 76.7 |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 |
| Evaluation | Drying up | 3 | 4 | 5 | 5 | 5 | 4 | 4 | 4 | 4 | 1 | 5 | 2 | 1 | 5 |
| | Precipitation | ○ | ○ | ○ | ○ | ○ | ○ | ○ | ○ | ○ | ○ | X | X | ○ | X |
| | Comprehensive evaluation | ○ | ○ | ○ | ○ | ○ | ○ | ○ | ○ | ○ | X | X | X | X | X |

TABLE 4

| | | Examples | | | | | | |
|---|---|---|---|---|---|---|---|---|
| | | 10 | 11 | 12 | 13 | 14 | 15 | 16 |
| Rosin Resin | Acrylic acid modified hydrogenated rosin | 7.0 | | | | | 2.0 | 2.0 |
| | Acrylic acid modified rosin | | 8.0 | | | | | 2.0 |
| | Hydrogenated rosin | | | 6.0 | | | 6.0 | 2.0 |
| | Disproportionated rosin | | | | 6.0 | | | 2.0 |

TABLE 4-continued

|  |  | Examples | | | | | | |
| --- | --- | --- | --- | --- | --- | --- | --- | --- |
|  |  | 10 | 11 | 12 | 13 | 14 | 15 | 16 |
| Organic acid | Polymerized rosin |  |  |  |  | 8.0 |  | 2.0 |
|  | Rosin ester | 5.0 | 5.0 | 5.0 | 5.0 | 5.0 | 4.0 | 8.0 |
|  | Palmitic acid | 0.3 | 0.3 | 0.3 | 0.3 | 0.3 | 0.3 | 0.3 |
| Solvent | Isopropyl alcohol | 87.7 | 86.7 | 88.7 | 88.7 | 86.7 | 87.7 | 81.7 |
|  | Total | 100.0 | 100.0 | 100.0 | 100.0 | 100.0 | 100.0. | 100.0 |
| Evaluation | Drying up | 5 | 5 | 5 | 5 | 5 | 4 | 5 |
|  | Precipitation | ○ | ○ | ○ | ○ | ○ | ○ | ○ |
|  | Comprehensive evaluation | ○ | ○ | ○ | ○ | ○ | ○ | ○ |

TABLE 5

|  |  | Examples | | | |
| --- | --- | --- | --- | --- | --- |
|  |  | 17 | 18 | 19 | 20 |
| Rosin resin | Acryic acid modified hydrogenated rosin | 9.0 |  | 9.0 | 2.8 |
|  | Acrylic acid modified rosin |  |  |  | 1.0 |
|  | Hydrogenated rosin | 9.0 | 0.5 | 9.0 | 5.2 |
|  | Dispropertionated rosin |  |  |  | 1.8 |
|  | Polymerized rosin |  |  |  | 1.6 |
|  | Rosin ester | 11.0 | 3.5 | 11.0 | 4.0 |
| Organic acid | Palmitic acid | 1.0 |  | 1.0 | 0.3 |
|  | Succinic acid |  |  |  | 0.1 |
|  | Glutanic acid |  |  |  | 0.1 |
| Organo-bromine compound | 2,3-Dibromo-1,4-butanediol |  |  |  | 0.8 |
|  | Trans-2,3-dibromo-2-butene-1,4-diol |  |  |  | 0.1 |
| Amine hydrobromide | Monoethylamine hydrobromide |  |  |  | 0.1 |
|  | 1,3-Diphenylguanzine hydrobromide |  |  |  | 0.4[ |
| Amine borohydrofluoride | Cyclohexylamine tetrafluoroborate |  |  |  | 0.[3 |
| Solvent | Isopropyl alcohol | 70.0 |  | 70.0 | 70.0 |
|  | Ethanol |  | 96.0 | 70.0 | 12.8 |
|  | Total | 100.0 | 100.0 | 100.0 | 100.0 |
| Evaluation | Drying up | 5 | 3 | 5 | 4 |
|  | Precipitation[ | ○ | ○ | ○ | ○ |
|  | Comprehensive evaluation | ○ | ○ | ○ | ○ |

TABLE 6

|  |  | Examples | | | | | | | | | | | |
| --- | --- | --- | --- | --- | --- | --- | --- | --- | --- | --- | --- | --- | --- |
|  |  | 21 | 22 | 23 | 24 | 25 | 26 | 27 | 28 | 29 | 30 | 31 | 32 |
| Rosin Resin | Acrylic acid modified hydrogenated rosin | 3.0 | 3.0 | 3.0 | 3.0 | 3.0 | 3.0 | 3.0 | 3.0 | 3.0 | 3.0 | 3.0 | 3.0 |
|  | Hydrogenated rosin | 5.0 | 5.0 | 5.0 | 5.0 | 5.0 | 5.0 | 5.0 | 5.0 | 5.0 | 5.0 | 5.0 | 5.0 |
|  | Rosin ester | 4.0 | 4.0 | 4.0 | 4.0 | 4.0 | 4.0 | 4.0 | 4.0 | 4.0 | 4.0 | 4.0 | 4.0 |
| Organic acid | Palmitic acid | 0.1 |  |  | 2.0 |  |  |  |  |  |  |  |  |
|  | Succinic acid |  | 0.3 |  | 1.0 |  |  |  |  |  |  |  |  |
|  | Glutanic acid |  |  | 0.5 | 1.0 |  |  |  |  |  |  |  |  |
| Organo-bromine compound | 2,3-Dibromo-1,4-butandediol |  |  |  |  | 0.01 | 0.8 | 3.0 |  |  |  |  |  |
|  | Trans-2,3-dibromo-2-butene-1,4-diol |  |  |  |  |  |  |  | 0.01 | 0.8 | 3.0 |  |  |
| Amine hydrobromide | Monoethylamine hydrobromide |  |  |  |  |  |  |  |  |  |  |  | 0.01 |
|  | 1,3-Diphenylguanizine hydrobromide |  |  |  |  |  |  |  |  |  |  |  |  |
| Amine borohydrofluoride | Cyclohexylamine tetrafluoroborate |  |  |  |  |  |  |  |  |  |  |  |  |
| Solvent | Isopropyl alcohol | 87.8 | 87.7 | 87.4 | 84.0 | 87.99 | 87.2 | 85.0 | 37.88 | 37.2 | 86.0 | 87.1 | 87.99 |
|  | Total | 100.0 | 100.0 | 100.0 | 100.0 | 100.0 | 100.0 | 100.0 | 100.0 | 100.0 | 100.0 | 100.0 | 100.0 |
| Evaluation | Drying up | 4 | 4 | 4 | 4 | 4 | 4 | 4 | 4 | 4 | 4 | 4 | 4 |
|  | Precipitation | ○ | ○ | ○ | ○ | ○ | ○ | ○ | ○ | ○ | ○ | ○ | ○ |
|  | Comprehensive evaluation | ○ | ○ | ○ | ○ | ○ | ○ | ○ | ○ | ○ | ○ | ○ | ○ |

|  |  | Examples | | | | | | | | | |
| --- | --- | --- | --- | --- | --- | --- | --- | --- | --- | --- | --- |
|  |  | 33 | 34 | 35 | 36 | 37 | 38 | 39 | 40 | 41 | 42 |
| Rosin Resin | Acrylic acid modified hydrogenated rosin | 3.0 | 3.0 | 3.0 | 3.0 | 3.0 | 3.0 | 3.0 | 3.0 | 3.0 |  |
|  | Hydrogenated rosin | 5.0 | 5.0 | 5.0 | 5.0 | 5.0 | 5.0 | 5.0 | 5.0 | 5.0 |  |
|  | Rosin ester | 4.0 | 4.0 | 4.0 | 4.0 | 4.0 | 4.0 | 4.0 | 4.0 | 4.0 | 4.0 |

TABLE 6-continued

| | | Ex | Ex | Ex | Ex | Ex | Ex | Ex | Ex | Ex | Ex |
|---|---|---|---|---|---|---|---|---|---|---|---|
| Organic acid | Palmitic acid | | | | | | | | | | 1.0 |
| | Succinic acid | | | | | | | | | | 1.0 |
| | Glutanic acid | | | | | | | | | | 1.0 |
| Organobromine compound | 2,3-Dibromo-1,4-butandediol | | | | | | | | | | 0.8 |
| | Trans-2,3-dibromo-2-butene-1,4-diol | | | | | | | | | | 0.1 |
| Amine hydrobromide | Monoethylamine hydrobromide | 0.08 | 1.0 | | | | 0.08 | | | | 0.08 |
| | 1,3-Diphenylguanizine hydrobromide | | | 0.01 | 0.08 | 1.0 | 0.3 | | | | 0.4 |
| Amine borohydrofluoride | Cyclohexylamine tetrafluoroborate | | | | | | | | 0.01 | 0.3 | 1.0 | 0.3 |
| Solvent | Isopropyl alcohol | 87.92 | 87.0 | 87.99 | 87.92 | 37.0 | 87.62 | 87.99 | 87.7 | 87.0 | 83.32 |
| | Total | 100.0 | 100.0 | 100.0 | 100.0 | 100.0 | 100.0 | 100.0 | 100.0 | 100.0 | 100.0 |
| Evaluation | Drying up | 4 | 4 | 4 | 4 | 4 | 4 | 4 | 4 | 4 | 4 |
| | Precipitation | ○ | ○ | ○ | ○ | ○ | ○ | ○ | ○ | ○ | ○ |
| | Comprehensive evaluation | ○ | ○ | ○ | ○ | ○ | ○ | ○ | ○ | ○ | ○ |

As seen from the results in the above Tables 3 and 4, in the flux of Examples 1 to 16, which contains 3.5 to 11% by mass of a rosin ester, more than 0% by mass and 18% by mass or less of a rosin resin other than a rosin ester, and 70% by mass or more and less than 96.5% by mass of a solvent, there was a little occurrence of the drying up and no occurrence of the precipitation.

Particularly in the flux of Examples 2, 6 to 9, and 15, which contain 4.0% by mass of the rosin ester, there was less occurrence of the drying up (Rank 4), and further in the flux of Examples 3 to 5 and 10 to 14, which contain 5 to 11.0% by mass of the rosin ester, there was extremely least occurrence of the drying up (Rank 5).

On the other hand, in the flux of Comparative Examples 1 and 4, in which the content of the rosin ester was less than 3.5% by mass, though there was no precipitation, the occurrence of the drying up was extremely high.

Further, in the flux of Comparative Examples 2 and 5, in which the content of the rosin ester was more than 11% by mass, though there was extremely least occurrence of the drying up, the precipitation occurred.

Furthermore, in the flux of Comparative Example 3, which contained no rosin resin other than a rosin ester, there was frequent occurrence of the drying up, and the precipitation also occurred.

Further, from the results of Examples 10 to 16 shown in the above Table 4, it was found that the state in which there was less occurrence of the drying up and no occurrence of the precipitation could be maintained, even if changing a type and a content ratio of the rosin resin other than a rosin ester.

As seen from the results of the above Table 5, in the flux of Examples 17 to 20 which contains 3.5 to 11% by mass of the rosin ester, more than 0% by mass and 18% by mass or less of the rosin resin other than a rosin ester, and 70% by mass or more and less than 96.5% by mass of the solvent, there was a little occurrence of the drying up and no occurrence of the precipitation. From the results of Examples 17 to 20, it was found that the state in which there was less occurrence of the drying up and no occurrence of the precipitation could be maintained, even if changing the content of the rosin resin other than a rosin ester within a range of numerical values of more than 0% by mass and 18% by mass or less.

Further, as seen from the result of the above Table 6, in the flux of Examples 21 to 42, which contains 3.5 to 11% by mass of the rosin ester, more than 0% by mass and 18% by mass or less of the rosin resin other than a rosin ester, 70% by mass or more and less than 96.5% by mass of the solvent, and further contains an organic acid, an organobromine compound, an amine hydrobromide, and/or, an amine borohydrofluoride, there was a little occurrence of the drying up and no occurrence of the precipitation. From the results of Examples 21 to 42, it was found that the state in which there was less occurrence of the drying up and no occurrence of the precipitation could be maintained, even if changing types and contents of the organic acid, the organobromine compound, the amine hydrobromide, and/or, the amine borohydrofluoride.

TABLE 7

| | | Examples | | |
|---|---|---|---|---|
| | | 7 | 8 | 32 |
| Rosin resin | Acrylic acid modified hydrogenated rosin | 3.0 | 3.0 | 3.0 |
| | Hydrogenated rosin | 5.0 | 5.0 | 5.0 |
| | Rosin ester | 4.0 | 4.0 | 4.0 |
| Organic acid | Palmitic acid | | 0.01 | |
| Amine hydrobromide | Monoethylamine hydrobromide | | | 0.01 |
| Solvent | Isopropyl alcohol | 88.0 | 87.99 | 87.99 |
| | Total | 100.0 | 100.00 | 100.00 |
| Evaluation | Wettability (%) | 64 | 52 | 77 |

From the results of Table 7, it was found that the flux of the above Examples 7, 8 and 32 was excellent in the solder wettability, too. Particularly, by comparing the results of Examples 7 and 32, it was found that the solder wettability can be improved by adding the amine hydrobromide.

The invention claimed is:

1. A flux comprising, based on the whole flux,
   3.5 to 11% by mass of a rosin ester,
   more than 0% by mass and 18% by mass or less of a rosin resin other than a rosin ester, and
   70% by mass or more and less than 96.5% by mass of a solvent,
   wherein the rosin resin other than a rosin ester is a rosin resin except a rosin-modified product below;
   a rosin-modified product being a reaction product of a rosin or a rosin derivative with an alkanolamine represented by the following Formula (1), the rosin-modified product having an amide bond obtained by condensing a COOH group of the rosin or the rosin derivative and a $NH_{3-n}$ group in Formula (1), or an ester bond obtained by condensing a COOH group of the rosin or the rosin derivative and an OH group in Formula (1):

$$NH_{3-n}-(R-OH)_n \ (n \leq 3). \qquad \text{Formula (1)}$$

2. The flux according to claim 1, further comprising 0.01 to 1% by mass of an amine hydrobromide, based on the whole flux.

3. The flux according to claim 1, further comprising an organic acid.

4. The flux according to claim 1, further comprising, based on the whole flux,
   0.3 to 2% by mass of an organic chlorine compound, and
   0.2 to 1.5% by mass of an organic phosphorous compound.

5. The flux according to claim 4, wherein the organic chlorine compound is at least one selected from the group consisting of chlorendic acid, chlorendic anhydride, and methyl pentachlorooctadecanoate.

6. The flux according to claim 4, wherein the organic phosphorous compound is at least one selected from the group consisting of 2-ethylhexyl (2-ethylhexyl)phosphonate, n-octyl (n-octyl)phosphonate, n-decyl (n-decyl)phosphonate, and n-butyl (n-butyl)phosphonate.

7. The flux according to claim 1, for use in a flow soldering method.

* * * * *